F. C. BERTRAM.
BASKET HANDLE.
APPLICATION FILED MAR. 16, 1917.
1,254,967.
Patented Jan. 29, 1918.
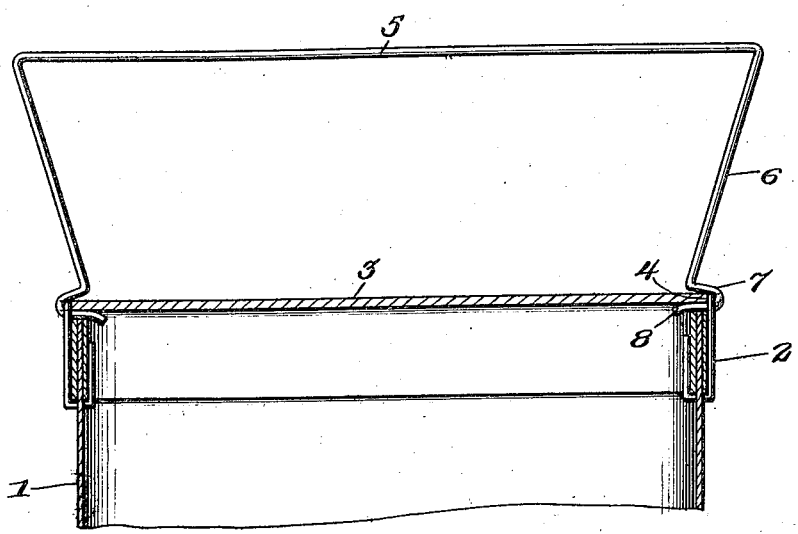
Fig. 1.
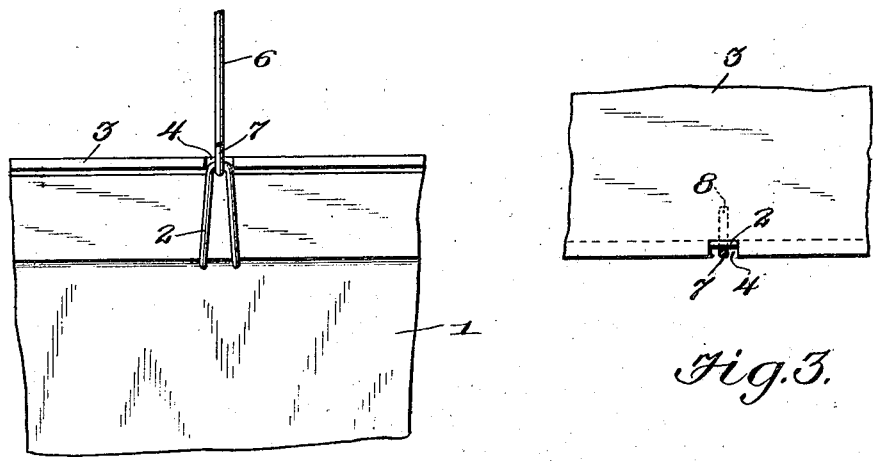
Fig. 2.
Fig. 3.
WITNESSES
J. H. Crawford,
L. Wilcox.
INVENTOR
F. C. Bertram,
BY Victor J. Evans
ATTORNEY

UNITED STATES PATENT OFFICE.

FRANCIS C. BERTRAM, OF PORTLAND, NEW YORK.

BASKET-HANDLE.

1,254,967. Specification of Letters Patent. Patented Jan. 29, 1918.

Application filed March 16, 1917. Serial No. 155,348.

*To all whom it may concern:*

Be it known that I, FRANCIS C. BERTRAM, a citizen of the United States, residing at Portland, in the county of Chautauqua and State of New York, have invented new and useful Improvements in Basket-Handles, of which the following is a specification.

This invention relates to basket handles and it includes the novel features hereinafter described and claimed.

An object of the invention is to provide a handle of simple and durable structure especially adapted to be used upon small baskets as for instance grape baskets and which not only serves the function as a means for carrying the basket but also serves as means for securely holding the cover in a closed position thereon.

With this object in view the handle is in the form of a single piece of material preferably resilient wire and includes an intermediate grip portion with converging side portions, the said side portions at their lower ends merging into outwardly disposed loops, the lower portions of which are slightly curved in order that they may engage in staples applied to the sides of the basket body and which serve to hold the handles connected with the said staples. The converging side portions of the handle may be used for directing the cover in position upon the upper edge of the body of the basket and the edge portions of the said cover may enter the loops whereby the cover is effectually held in position upon the top edge of the body of the basket.

In the accompanying drawing:—

Figure 1 is a transverse sectional view of a basket showing the handle applied;

Fig. 2 is a fragmentary side elevation of the same.

Fig. 3 is a fragmentary plan view of the same showing parts in section.

As illustrated in the accompanying drawing, the basket body 1 is of the usual configuration and is provided at its opposite sides and at its upper edges with staples 2. A cover 3 is arranged to close over the upper edge of the basket body 1 and the said cover may be provided at its side edges with notches 4.

The handle is made from a single piece of spring or resilient wire and includes an intermediate grip portion 5 with converging side portions 6. The portions 6 at their lower ends merge into outwardly disposed loops 7 and the lower sides of the said loops are downwardly curved at their ends as at 8. When the handle is applied to the basket body 1 the side portions 6 are spread with relation to each other and the curved ends 8 are inserted through the staples 2. The said side portions 6 of the handle are then released and the lower ends thereof move toward each other whereby the staples 2 are received in the loops 7 hereinbefore described.

In view of the fact that the side portions 6 converge downwardly toward each other when it is desired to apply the cover 3 to the body 1 one edge of the said cover may be inserted in one of the loops 7 and then the opposite edge of the said cover is moved down along the opposite side portions 6 whereby the said side portion is spread with relation to that loop which receives the opposite edge of the said cover. When the edge of the cover arrives at the loop 7 which has been temporarily displaced the resiliency of the handle comes into play whereby the last mentioned loop moves toward the first mentioned loop and the opposite edge portions of the cover 3 are received in the said loop. In view of the fact that the said cover 3 is provided at its opposite edges with notches 4 the said notches receive the outer portions of the loops 7 thus holding the cover 3 against longitudinal movement with relation to the body of the basket 1.

To remove the cover from the basket the operation above described may be reversed.

From the foregoing description taken in conjunction with the accompanying drawing, it will be seen that a basket handle of simple and durable structure is provided and that the same not only serves as means for carrying the basket but also serves as means for securely holding the cover in position at the top edge of the body of the basket.

Having described the invention what is claimed is:—

In combination with a basket body provided at its sides with staples, and a cover having at its opposite sides notches, a basket handle comprising a single piece of resilient material having an intermediate grip portion and converging side portions, the lower ends of the said side portions merging into
5 outwardly disposed loops which engage through the said staples, the lower portions of the said loops being downwardly curved, the notches of the cover being adapted to receive the outer portions of the loops when the cover is in position upon the top edge of the basket body.

In testimony whereof I affix my signature.

FRANCIS C. BERTRAM.